United States Patent
Frieh et al.

(10) Patent No.: US 9,480,028 B1
(45) Date of Patent: Oct. 25, 2016

(54) ADJUSTING TRANSMISSION POWER IN CUSTOMER PREMISE EQUIPMENT

(75) Inventors: Dwain E. Frieh, Oswego, IL (US); Gregory Gohman, Beaverton, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 343 days.

(21) Appl. No.: 13/493,161

(22) Filed: Jun. 11, 2012

Related U.S. Application Data (60) Provisional application No. 61/495,807, filed on Jun. 10, 2011.

(51) Int. Cl.
| | |
|---|---|
| H04W 72/00 | (2009.01) |
| H04B 7/00 | (2006.01) |
| H04W 52/26 | (2009.01) |
| H04W 72/12 | (2009.01) |

(52) U.S. Cl.
CPC ......... H04W 52/26 (2013.01); H04W 72/1226 (2013.01)

(58) Field of Classification Search
CPC ........... H04W 52/241; H04W 52/265; H04W 52/245
USPC ...................... 455/522, 450–452.2, 509, 513
See application file for complete search history.

(56) References Cited

U.S. PATENT DOCUMENTS

| | | | |
|---|---|---|---|
| 6,212,364 B1* | 4/2001 | Park | 455/69 |
| 6,792,040 B1* | 9/2004 | Davis et al. | 375/222 |
| 7,113,757 B2* | 9/2006 | Chu et al. | 455/127.1 |
| 7,221,712 B1* | 5/2007 | Schwartzman | H04N 7/17309 348/E17.003 |
| 7,627,024 B2* | 12/2009 | Erving et al. | 375/222 |
| 7,711,386 B2* | 5/2010 | Sung et al. | 455/522 |
| 7,751,338 B2* | 7/2010 | Azenko et al. | 370/252 |
| 8,136,141 B2* | 3/2012 | Al-Banna | H04B 1/401 370/252 |
| 8,218,609 B2* | 7/2012 | Walton et al. | 375/219 |
| 2002/0061073 A1* | 5/2002 | Huang et al. | 375/295 |
| 2004/0068748 A1* | 4/2004 | Currivan et al. | 725/111 |
| 2004/0162097 A1* | 8/2004 | Vijayan et al. | 455/522 |
| 2004/0228283 A1* | 11/2004 | Naguib et al. | 370/252 |
| 2005/0122996 A1* | 6/2005 | Azenkot | H04L 12/2801 370/477 |
| 2005/0152466 A1* | 7/2005 | Maltsev et al. | 375/260 |
| 2005/0276336 A1* | 12/2005 | Khan | 375/260 |
| 2006/0094372 A1* | 5/2006 | Ahn et al. | 455/67.13 |
| 2007/0032256 A1* | 2/2007 | Kolze | 455/522 |
| 2007/0232346 A1* | 10/2007 | Takano et al. | 455/522 |
| 2009/0190485 A1* | 7/2009 | Bjorkegren et al. | 370/252 |
| 2010/0246598 A1* | 9/2010 | Bremer et al. | 370/464 |

* cited by examiner

*Primary Examiner* — Simon Nguyen
(74) *Attorney, Agent, or Firm* — Stewart M. Wiener (57) ABSTRACT

Methods, systems, and apparatuses operate to adjust transmission power of a customer premise equipment device using a transmit channel set parameter. Power characteristics associated with a received signal from a customer premise equipment device can be identified, and a determination is made whether to adjust a transmission power associated with transmission of the signal. Based upon the determination, an adjustment can be made to the transmission power using a transmit channel set parameter, thereby adjusting the channels used by the customer premise equipment device to transmit the signal.

18 Claims, 5 Drawing Sheets

ADJUSTING TRANSMISSION POWER IN CUSTOMER PREMISE EQUIPMENT

CROSS-REFERENCE TO RELATED APPLICATIONS

This application is a non-provisional of and claims priority to the filing date of U.S. Provisional Patent Application Ser. No. 61/495,807, entitled "Cable Modem Transmit Power," filed Jun. 10, 2011, which is hereby incorporated by reference as if set forth herein in its entirety.

TECHNICAL FIELD

This disclosure relates to transmission power adjustments.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

The DOCSIS 3.0 MULPI (CM-SP-MULPIv3.0-I18) and PHY (CM-SP-PHYv3.0-I10) specifications (both of which are hereby incorporated by reference in their entirety) include functionality outlining the operation of upstream channel bonding (USCB). One aspect of USCB includes a power level that a cable modem transmits on the channel(s) in the transmit channel set (TCS). A cable modem typically transmits at a power level based on commands from the CMTS. The power level typically lies within a range window. The range window is typically a function of the number of channels in the TCS and the modulations of those channels. The TCS parameter is typically optimized by the CMTS to include the largest set of channels available to the CM.

BRIEF DESCRIPTION OF THE DRAWINGS

Like reference numbers and designations in the various drawings indicate like elements.

DETAILED DESCRIPTION

It can be helpful for the CMTS to dynamically reduce the number of channels in the TCS, thereby facilitating transmission from the CM at a higher power level on the channel set, for example, in cases where signal degradation is an issue. Alternatively, it may be helpful for the CMTS to dynamically choose channels for this CM with higher transmit power capability (e.g., channels at lower modulation frequencies).

This disclosure describes a concept and mechanism for a CMTS to control the TCS selection for a CM based on signal quality metrics such as signal-to-noise-ratio (SNR). In some implementations, the TCS selection can include TCS size and optionally channels with different modulations to allow higher power.

Figure 1:
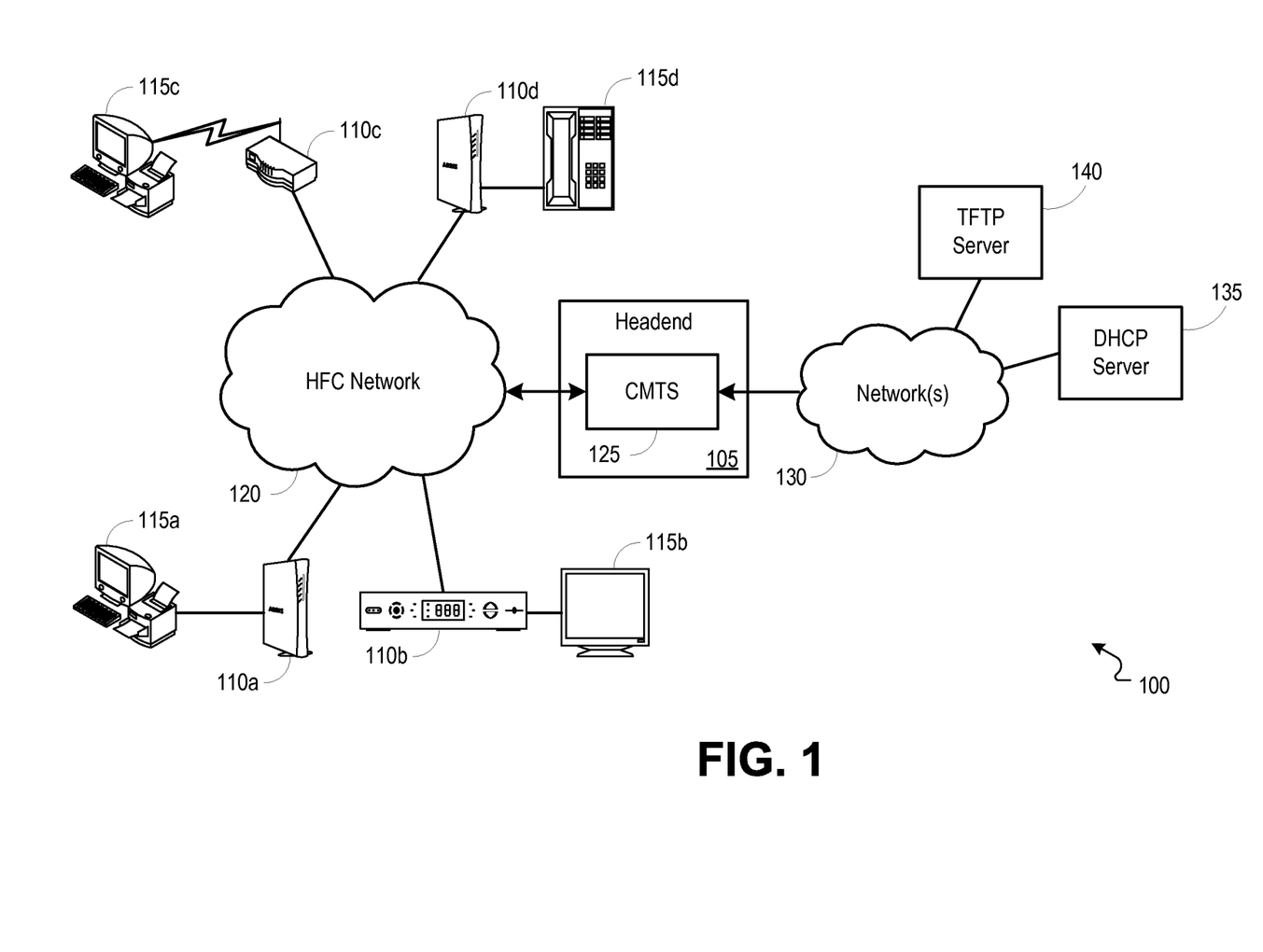
FIG. 1 is a block diagram illustrating an example network environment 100 operable to adjust transmission power in customer premise equipment devices.

FIG. 1 is a block diagram illustrating an example network environment 100 operable to adjust transmission power in customer premise equipment (CPE) devices. In some implementations, a headend 105 can provide video, data and/or voice service(s) to CPE devices 110a-d in one or more subscriber groups (e.g., service group(s)). The CPE devices can include, for example, a cable modem 110a, a set top box 110b, a wireless router including an embedded cable modem 110c, or a media terminal adapter (MTA) 110d, among others. A cable modem 110a can facilitate communications between the headend 105 and a computer 115a. A set top box 110b can facilitate communications from the headend 105 to a television or a digital video recorder. A wireless router 110c can facilitate wireless communications between a computer 115c and a headend 105. An MTA 110d can facilitate communications between a telephone 115d and a headend 105.

The CPE devices 110a-d can communicate with the headend 105 via a hybrid fiber-coax (HFC) network 120. The headend 105 can include devices such as a cable modem termination system (CMTS) 125 and/or a quadrature amplitude modulator (QAM) device (not shown), or a combined or converged device (not shown) including multiple edge and/or video or data processing functionalities. Such devices can operate to facilitate communications between a network 130 and the CPE devices 110a-d. In various implementations, the network 130 can include one or more networks internal to the headend and/or one or more networks external to the headend (e.g., one or more extranets, the Internet, etc.).

Data services can be handled by the headend 105 through a CMTS 125. The CMTS 125 can receive data signals from external device(s) or nodes through network(s) 130. The network(s) 130, for example, can operate using internet protocol (IP), sending data packets to and receiving data packets from the headend 105. In some examples, the CMTS 125 can be paired with a SIP proxy server (not shown) operable to provide voice over internet protocol (VoIP) services with voice connectivity to other subscribers or voice connectivity to a public switched telephone network (PSTN) (not shown). In still further examples, one or more video sources may provide streaming data through the network(s) 130 to the CMTS 125.

In some implementations, the CMTS 125 can forward packets destined for subscribers to an edge-QAM (EQAM) device used to apply the signal to a carrier waveform. In some implementations, the carrier waveform can include either or both data and video streams, in either or both multicast and unicast (e.g., point-to-point) formats for transmission to a combiner, which can combine multiple signals onto a single fiber for transmission to one or more CPE devices 110a-d via the hybrid fiber-coax (HFC) network 120. In other implementations, the CMTS 125 can apply a baseband signal to a carrier wave and transmit the modulated signal to a combiner for transmission to one or more CPE devices 110a-d via the hybrid fiber-coax (HFC) network 120.

Figure 2:
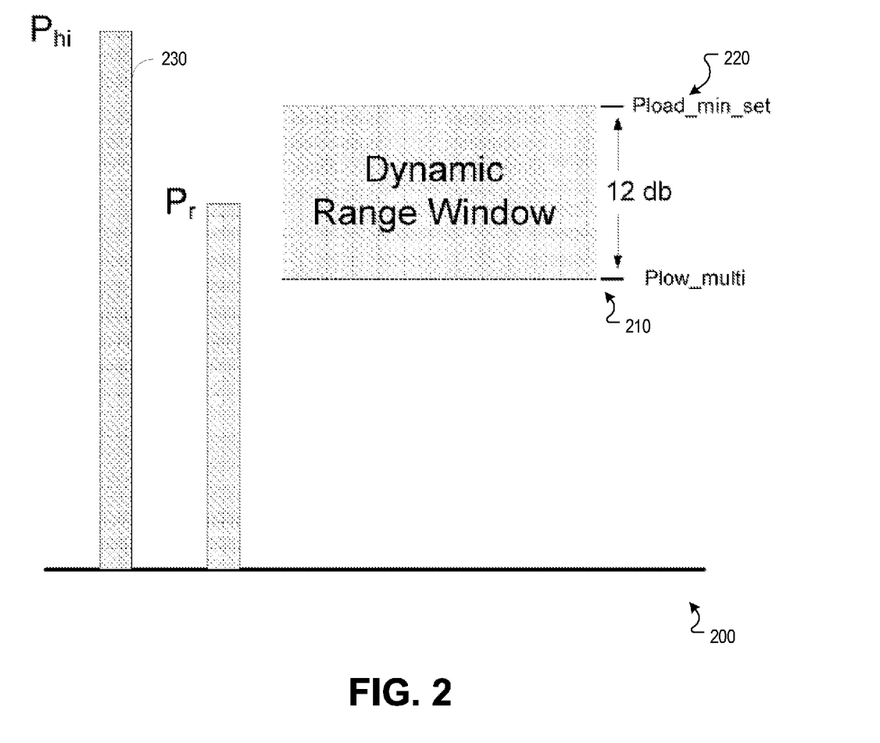
FIG. 2 is a graph showing an example dynamic range window and transmit power levels.

DOCSIS 3.0, which is hereby incorporated by reference as if set forth herein in its entirety, specifies that a CM transmits within a 12 dB power range called the dynamic range window (DRW) across its bonded set of upstream channels (see, e.g., dynamic range window 210 of FIG. 2). The CMTS provides the CM with a parameter called Pload_min_set (e.g., Pload_min_set 220 of FIG. 2) which sets the DRW relative to a CM-calculated value, Phi_n (e.g., Phi 230 of FIG. 2), for each channel. The value Phi_n is calculated based on the number of channels in the TCS and the QAM constellation as provided by the DOCSIS 3.0 PHY spec (CM-SP-PHYv3.0-I10) at tables 6-7 to 6-9, which have been incorporated by reference (see also, e.g., FIG. 3). Pr can be identified as a reported power level (dBmV) of a CM in a management information base (MIB) for a particular channel (e.g., based on a 64 QAM constellation).

In some implementations, due to, for example, noise conditions present on one or more of the channels in the TCS, it can be helpful for the CM to transmit at higher power levels so as to increase the power level or SNR seen at the CMTS. However, due to the constraints of the DRW, there is an upper limit imposed on the transmit power in order to stay within the window. Note that the DOCSIS 3.0 PHY specification (CM-SP-PHYv3.0-I04)—tables 6-7 to 6-9 specify that higher per-channel power levels are allowed as the number of channels in the TCS decrease. However, typical operation of CPE devices does not provide a mechanism for the number of channels in the TCS to be proactively reduced (as commanded by the CMTS) in order to increase the per-channel transmit power.

Figure 3:
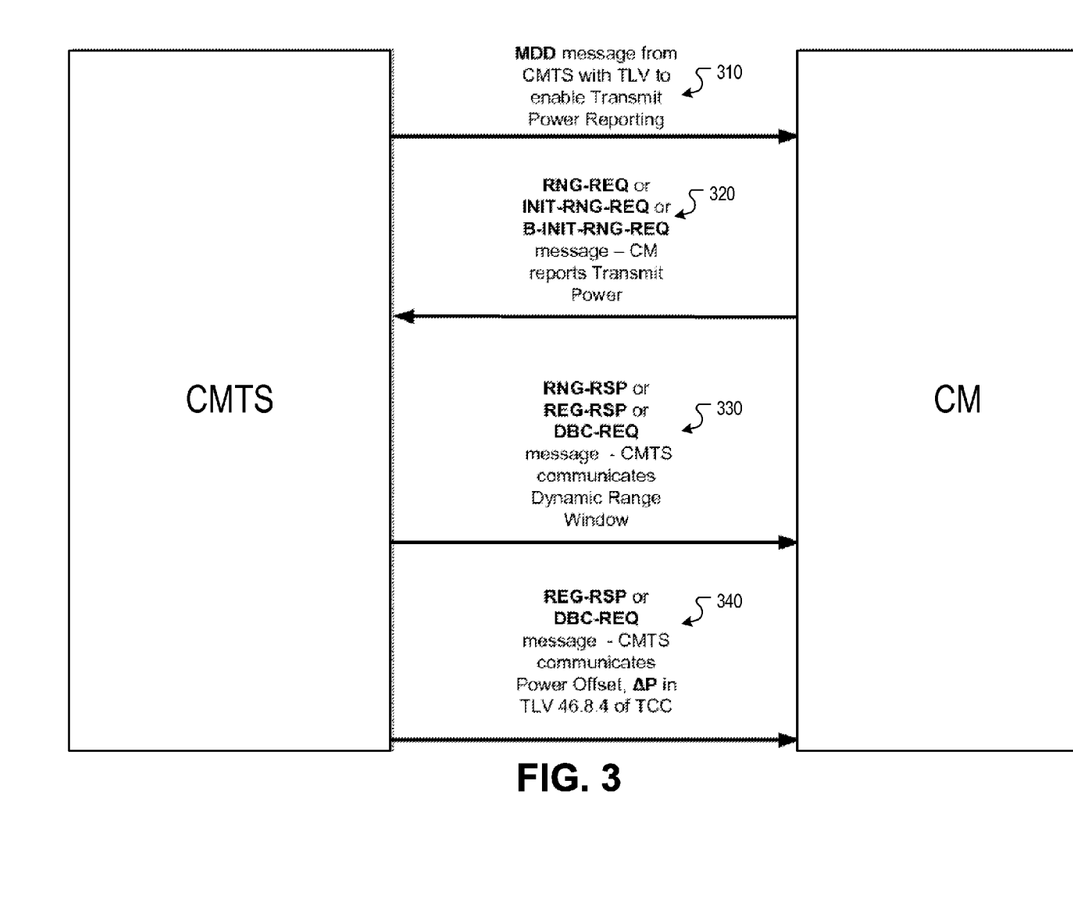
FIG. 3 is a block diagram showing an example signaling sequence 300 between the CMTS and the CM.

FIG. 3 is a block diagram showing an example signaling sequence 300 between the CMTS and the CM. The sequence begins with the CMTS broadcasting MDD messages over various downstream channels. The MDD messages include information about the network topology and upstream channel ambiguities. The MDD messages also include a parameter operable to enable transmit power reporting. When this field is enabled, the CM reports its transmit power in a ranging process.

At stage 320, the CM typically responds to the MDD message with a ranging request (RNG-REQ), initial ranging request (INIT-RNG-REQ) or a bonded initial ranging request (B-INIT-RNG-REQ) message.

In response to the ranging request received from the CM, the CMTS issues a ranging response (e.g., RNG-RSP), registration response (e.g., REG-RSP), or dynamic bonding change request (e.g., DBC-REQ) message to the CM at stage 330. These responses/requests from the CMTS can include a parameter that identifies the dynamic range window for the CM.

At stage 340, the CMTS sends a registration response or dynamic bonding change request to the CM. This registration/request message can include a power offset (e.g., $\Delta P$) parameter to be used by the CM.

Using the transmit power information received from the CM and to reduce signal degradation issues by increasing power, the CMTS can monitor the incoming signal power level and the SNR on a CM's upstream channels and compare the received signal power with the power level that the CM is using to transmit. Based on this information, the CMTS can determine if it would be beneficial to increase the CM's transmit power by (for example) reducing the TCS to a lower number of channels than it would have directed otherwise.

If this is the case, the CMTS can dynamically respond by specifying the reduced-size TCS. The CMTS can reduce the size of the TCS in one of two ways depending on when the signal degradation is identified.
1. At registration time—In this case, the CMTS conveys the TCS in the Registration Response message.
2. After registration—In this case the CMTS conveys the TCS with a Dynamic Bonding Change (DBC) exchange with the CM.

In some implementations, by way of providing an alternative solution, the CMTS can dynamically choose the channels for this CM with higher transmit power capability (i.e. lower modulations or constellations). Thus, it should be understood that this disclosure is not limited to any particular method of specifying the reduced-size TCS or actively reducing the TCS size, but choosing the channels for the TCS parameter to better optimize the power capability of the CM.

Figure 4:
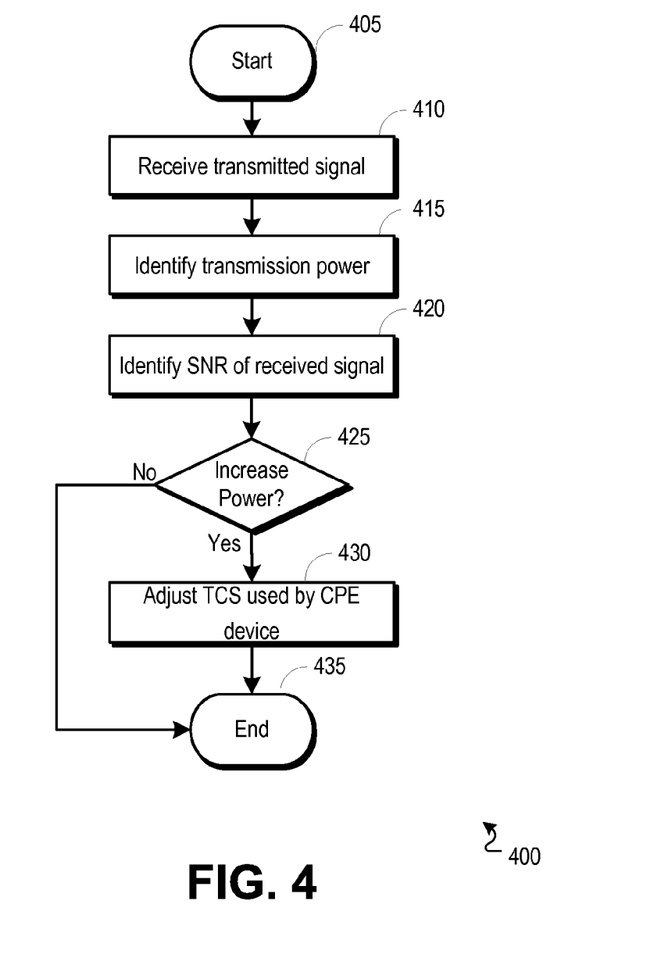
FIG. 4 is a flowchart showing an example operational scenario for adjusting the transmit power level for a customer premise equipment device.

FIG. 4 is a flowchart showing an example operational scenario for adjusting the transmit power level for a customer premise equipment device. The process 400 begins at stage 405. At stage 410, a transmitted signal is received. The transmitted signal can be received, for example, by a CMTS (e.g., CMTS 125 of FIG. 1). In various examples, the transmitted signal can be a ranging request, initial ranging request, or bonded ranging request. In other examples, the transmitted signal can be a signal transmitted after registration (e.g., during operation of a CPE device).

At stage 415, transmission power level is determined. The transmission power can be determined, for example, by the CMTS. In some implementations, information contained within the signal received at the CMTS can be used to determine the power level the CPE device used to transmit the signal. This information can, for example, be included in a ranging message or other maintenance message.

At stage 420, a signal to noise ratio associated with the received signal can be identified. The signal to noise ratio can be identified, for example, by the CMTS (e.g., CMTS 125 of FIG. 1). The signal to noise ratio can be calculated based upon known methods for calculating the ratio of the signal to the noise level included in the received signal.

At stage 425, a determination is made whether to increase the transmission power for the signal. The determination can be made, for example, by the CMTS (e.g., CMTS 125 of FIG. 1). Increasing the transmission power can increase the signal to noise ratio by increasing the amplitude of the signal being communicated upstream by the CPE device. In some implementations, the determination to increase the power of the transmission is made based upon a comparison of the SNR to the transmission power level with which the signal was transmitted. If the comparison falls outside a threshold range, the CMTS can instruct the CPE device to increase the power of its transmissions.

If the determination is made to increase the power of the CM's transmissions, the process 400 continues to stage 430, where the TCS parameter associated with the device is adjusted. The TCS parameter can be adjusted, for example, by the CMTS (e.g., CMTS 125 of FIG. 1). In some implementations, the number of channels included in the TCS can be reduced to facilitate increased transmission power on the remaining channels in the TCS. In other implementations, the particular channels used for the upstream transmissions can be adjusted by dynamically choosing the channels to be used to include those capable of higher transmit power. The process 400 ends at stage 435 after the TCS is adjusted, or if there is a determination not to increase the power associated with the transmission of the received signal.

In an example, a CM can range and register with the CMTS. The CM can be confirmed for multiple transmit channel mode (MTCM) operation by the CMTS based upon the registration response message. Based upon being confirmed for MTCM, the CM can implement upstream channel bonding.

In this example, there might be no upstream channel signal degradation detected by the CMTS during ranging and registration time. The metrics used to determine signal degradation can include SNR as well as the threshold-power-offset. Threshold power-offset is a configurable value that represents the lowest received upstream channel power level used for reliable communication.

In this example, four upstream channels are available for this CM. These four channels are communicated to the CM as its TCS in using the registration response message. That is, upstream channel bonding is optimized to utilize the highest number of channels possible for this CM.

After operating normally for some amount of time, the CMTS identifies that signal degradation is now occurring on one or more of the channels in the CM's TCS (i.e. received signal power level has declined below the threshold-power-offset and/or the SNR has declined to an unacceptable level). The CMTS can then:

Reduce the TCS size from 4 channels to 2 channels. This new TCS can be communicated to the CM with a dynamic bonding change (DBC) exchange, for example, with the CM. The smaller number of channels in the TCS will allow the CM to transmit at higher power per channel as described above.

The intent of the above actions is to allow higher transmit power per channel in an attempt to alleviate the power degradation as seen by the CMTS, thus restoring reliable communications.

If further improvement is determined to be beneficial, the TCS size may be reduced to one channel to allow even higher transmit levels.

Note that the signal degradation may be a condition that would result in the cable operator investigating and repairing the cable plant. When fixed, the CM could return to utilizing the full set of available channels in the TCS. In such instances, the CMTS can identify a reduction in signal degradation (e.g., based on an increased SNR) and instruct the CM device to begin transmission on an increased number of channels.

Also note that if signal degradation is present when the CM originally ranges and registers, the CMTS has the option of reducing the TCS to a lower channel count immediately (in the registration response, for example). Note that the CMTS could do a later DBC exchange with the CM in order to increase the TCS if it detects the signal levels have improved.

Figure 5:
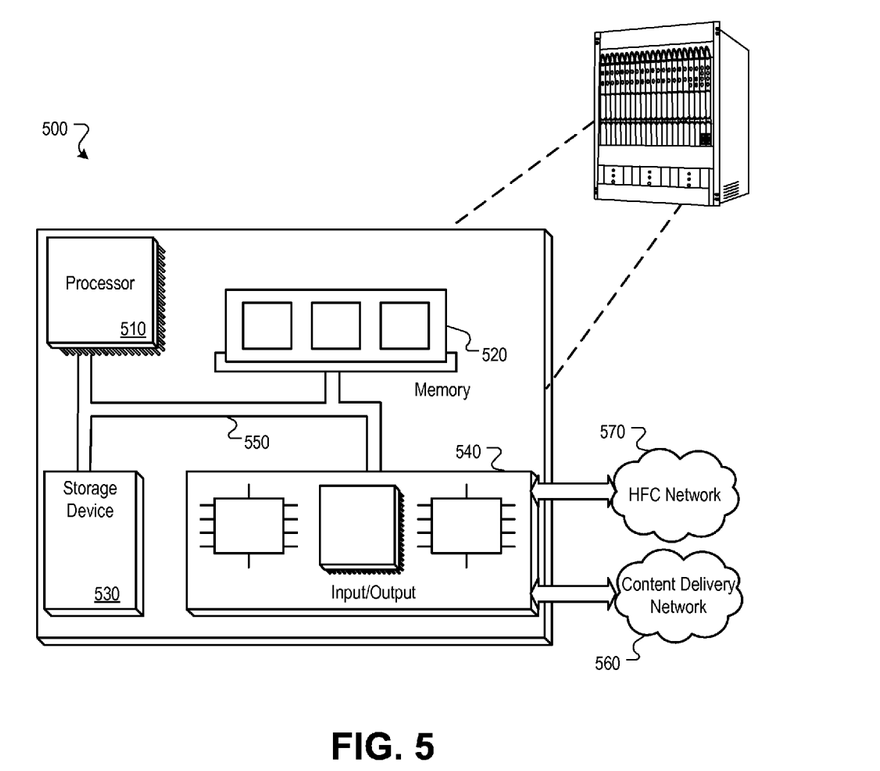
FIG. 5 is a block diagram of a simplified CMTS operable to adjust the power level of a customer premise equipment device based upon a transmit channel select parameter.

FIG. 6 is a block diagram of an example simplified CMTS operable to adjust the transmission power of a CPE device. However, it should be understood that many different kinds of network devices (e.g., including network hubs, bridges, routers, edge termination devices, etc.) can implement a packet loss identification mechanism. The CMTS 600 can include a processor 610, a memory 620, a storage device 630, and an input/output device 640. Each of the components 610, 620, 630, and 640 can, for example, be interconnected using a system bus 650. The processor 610 is capable of processing instructions for execution within the CMTS 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the device 600. In one implementation, the memory 620 is a computer-readable medium. In one implementation, the memory 620 is a volatile memory unit. In another implementation, the memory 620 is a non-volatile memory unit.

In some implementations, the storage device 630 is capable of providing mass storage for the CMTS 600. In one implementation, the storage device 630 is a computer-readable medium. In various different implementations, the storage device 630 can, for example, include a hard disk device, an optical disk device, flash memory or some other large capacity storage device.

The input/output device 640 provides input/output operations for the CMTS 600. In one implementation, the input/output device 640 can include one or more of a plain old telephone interface (e.g., an RJ11 connector), a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, such as one or more subscriber devices 660 (e.g., set top box, cable modem, etc.), as well as sending communications to, and receiving communications from a network 670. Other implementations, however, can also be used, such as mobile computing devices, mobile communication devices, set-top box television client devices, etc.

The CMTS of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   receiving an upstream signal transmitted from a cable modem;
   identifying a transmission power of the received signal at a cable modem termination system or a converged cable access device;
   identifying a signal to noise ratio associated with the received signal;
   determining, at the cable modem termination system or converged cable access device, a first determination and a second determination, wherein the first determination indicates whether to increase the power associated with the transmission of the received signal based upon a comparison of the transmission power to the signal to noise ratio and an evaluation of the potential data rate improvement, and wherein the second determination, based upon comparing the transmission power with a maximum power specified, indicates whether the cable modem can transmit increased transmission power using the current channel assignment; and
   if the first determination is to increase the power associated with the transmission of the received signal and the second determination indicates that increased power on the current channel assignment cannot be performed, adjusting a transmit channel set parameter associated with the cable modem, wherein the transmit channel set parameter provides an indication for instructing the cable modem to adjust a number of channels used by the cable modem for transmitting the signal; and wherein adjusting the transmit channel set parameter comprises:
 identifying channels with higher transmit power capabilities, and
 including the channels with higher transmit power capabilities in a transmit channel set on which the cable modem is assigned to transmit.

2. The computer-implemented method of claim 1, wherein adjusting the transmit channel set parameter comprises reducing the number of channels included in the transmit channel set parameter.

3. The computer-implemented method of claim 1, further comprising:
 determining whether transmission power associated with transmission of the signal is above a high power threshold based upon a comparison of the transmission power to the signal to noise ratio;
 if the comparison is below the specified threshold, adjusting the transmit channel set parameter to decrease the transmission power associated with the transmission of the signal.

4. The computer-implemented method of claim 1, wherein determining whether to increase the power associated with the transmission of the received signal comprises determining that power level is below a low power threshold based upon a comparison of the transmission power to the signal to noise ratio, and if the power is below the low power threshold, determining to increase the power associated with transmission of the signal.

5. The computer-implemented method of claim 1, wherein the signal comprises a plurality of channels.

6. The computer-implemented method of claim 5, wherein the plurality of channels are DOCSIS channels.

7. The computer implemented method of claim 1, wherein identifying a transmission power associated with transmission of the signal comprises receiving a parameter set by the remote device identifying the transmission power.

8. A system, comprising:
 a cable modem operable transmit a signal upstream on a cable network;
 a central cable network node operable to receive the signal via the network, identify whether to adjust the power associated with transmission of the signal based upon power characteristics associated with the signal, and to transmit a command to the cable modem comprising an adjustment to a transmit channel set parameter associated with the cable modem based upon the power characteristics associated with the signal, wherein the transmit channel set parameter provides an indication for instructing the cable modem to increase transmission power of the transmitted signal, or if transmission power cannot be increased based upon reaching a maximum power level allowable by the cable modem, wherein the transmit channel set parameter provides an indication for instructing the cable modem to adjust a number of channels used by the cable modem for transmitting the signal;
 wherein the cable modem is operable to receive the command and adjust transmission power or adjust the number of channels used based upon instructions in the transmit channel set parameter, thereby adjusting the transmission power associated with signals the remote device transmits upstream on the network while remaining in a dynamic range window associated with the cable modem.

9. The system of claim 8, wherein the central network node is operable to adjust the transmit channel set parameter by reducing the number of channels included in the transmit channel set parameter, thereby allowing increased signal transmission power.

10. The system of claim 8, wherein the central network node is operable to adjust the transmit channel set parameter by:
 identifying channels with higher transmit power capabilities, and
 including those channels with higher transmit power capabilities in the transmit channel set parameter included in the command sent to the remote device, thereby increasing the transmission power of the signal.

11. The system of claim 8, wherein the central network node is operable to adjust the transmit channel set parameter by increasing the number of channels included in the transmit channel set parameter, thereby decreasing the transmission power of the remote device.

12. The system of claim 8, wherein the central network node is operable to adjust the transmit channel set parameter by:
 identifying channels with lower transmit power capabilities, and
 including those channels with lower transmit power capabilities in the transmit channel set parameter included in the command sent to the remote device, thereby decreasing the transmission power of the signal.

13. The system of claim 8, wherein the signal comprises a plurality of channels.

14. The system of claim 13, wherein the plurality of channels are DOCSIS channels.

15. The system of claim 8, wherein the central network node is further operable to identify a transmission power associated with transmission of the signal by extracting a parameter sent by the remote device identifying the transmission power.

16. One or more non-transitory computer readable media embodied in computer executable instructions that, when executed, cause a processor to perform operations comprising:
 receiving a signal transmitted from a cable modem;
 identifying transmission power characteristics of the received signal at a cable plant headend;
 determining a first determination and a second determination, wherein the first determination indicates whether to adjust a transmission power associated with the transmission of the received signal based upon the transmission power characteristics, and wherein the second determination, based upon comparing the transmission power with a maximum power specified, indicates whether the cable modem can transmit increased transmission power using the current channel assignment based on a dynamic range window associated with the cable modem; and
 if the first determination is to adjust the transmission power associated with the transmission of the received signal and the second determination indicates that increased power on the current channel assignment cannot be performed, adjusting a transmit channel set parameter associated with the cable modem, wherein the transmit channel set parameter provides an indication for instructing the cable modem to adjust a number of channels used by the cable modem for transmitting the signal; and wherein adjusting the transmit channel set parameter comprises:
identifying channels with higher transmit power capabilities, and
including the channels with higher transmit power capabilities in a transmit channel set on which the cable modem is assigned to transmit.

17. The computer readable media of claim 16, wherein adjusting the transmit channel set parameter comprises:
reducing the number of channels included in the transmit channel set parameter, thereby increasing the transmission power associated with the transmission of the signal.

18. The computer readable media of claim 16, wherein adjusting the transmit channel set parameter comprises:
increasing the number of channels included in the transmit channel set parameter, thereby decreasing the transmission power associated with the transmission of the signal.

\* \* \* \* \*